(12) United States Patent
Miranda et al.

(10) Patent No.: US 11,076,372 B1
(45) Date of Patent: Jul. 27, 2021

(54) SYSTEMS AND METHODS FOR ACCESSING AN AIR-TO-GROUND NETWORK

(71) Applicant: GOGO BUSINESS AVIATION LLC, Broomfield, CO (US)

(72) Inventors: Heinz A. Miranda, Cary, IL (US); James P. Michels, Lake Zurich, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

(21) Appl. No.: 16/799,374

(22) Filed: Feb. 24, 2020

(51) Int. Cl.
| | |
|---|---|
| *H04W 56/00* | (2009.01) |
| *H04W 64/00* | (2009.01) |
| *H04W 76/27* | (2018.01) |
| *H04W 76/11* | (2018.01) |
| *H04W 4/40* | (2018.01) |
| *H04W 74/08* | (2009.01) |

(52) U.S. Cl.
CPC .......... *H04W 56/001* (2013.01); *H04W 4/40* (2018.02); *H04W 64/003* (2013.01); *H04W 74/0833* (2013.01); *H04W 76/11* (2018.02); *H04W 76/27* (2018.02)

(58) Field of Classification Search
None
See application file for complete search history.

(56) References Cited

U.S. PATENT DOCUMENTS

| | | | | |
|---|---|---|---|---|
| 6,163,533 A * | 12/2000 | Esmailzadeh | ........... | H04J 13/16 370/342 |
| 8,848,605 B2 * | 9/2014 | Ohm | ........................ | H04B 7/26 370/328 |
| 8,914,022 B2 * | 12/2014 | Kostanic | ............... | H04W 16/28 455/431 |
| 10,117,113 B2 * | 10/2018 | Braun | ............... | H04W 72/0446 |
| 10,425,148 B2 * | 9/2019 | Jalali | .................... | H04W 72/085 |
| 10,644,784 B2 * | 5/2020 | Jalali | ....................... | H04B 7/212 |

(Continued)

FOREIGN PATENT DOCUMENTS

EP    3249825 A1    11/2017

OTHER PUBLICATIONS

International Search Report and Written Opinion for Application No. PCT/US2020/066292, dated Mar. 22, 2021.

(Continued)

*Primary Examiner* — Bunjob Jaroenchonwanit
(74) *Attorney, Agent, or Firm* — Marshall, Gerstein & Borun LLP; Randall G. Rueth

(57) ABSTRACT

Systems and method for establishing a connection between a vehicle and a base station are provided. The base station sectors are divided into subsector respectively associated with a narrowbeam antenna. To determine the vehicle location without the use of a complementary network, the base station and the vehicle may associate each subsector with a respective set of radio access preamble sequences. Accordingly, the location of the vehicle can be determined based on the particular radio access preamble sequence included in the synchronization messaging. Additionally or alternatively, the base station may be configured to sequentially activate the narrowbeam antennas to detect a which narrowbeam is active when the vehicle responds to a message communicated over the narrowbeams.

19 Claims, 10 Drawing Sheets

(56) References Cited

U.S. PATENT DOCUMENTS

| | | | |
|---|---|---|---|
| 10,841,959 B2* | 11/2020 | Islam | H04W 72/005 |
| 2012/0026952 A1* | 2/2012 | Okubo | H04W 74/008 |
| | | | 370/329 |
| 2012/0250659 A1 | 10/2012 | Sambhwani | |
| 2014/0064110 A1* | 3/2014 | Viorel | H04W 8/005 |
| | | | 370/252 |
| 2015/0085761 A1* | 3/2015 | Maltsev | H04W 52/06 |
| | | | 370/329 |
| 2016/0099769 A1* | 4/2016 | Moffatt | H04B 7/1555 |
| | | | 455/431 |
| 2016/0323757 A1* | 11/2016 | Braun | H04W 72/0446 |
| 2017/0048826 A1 | 2/2017 | Kishiyama | |
| 2017/0155442 A1* | 6/2017 | Hommel | H04W 72/0453 |
| 2018/0014261 A1* | 1/2018 | Miranda | H04W 52/346 |
| 2018/0176869 A1* | 6/2018 | Aryafar | H04W 52/42 |
| 2018/0220466 A1* | 8/2018 | Park | H04W 72/0446 |
| 2018/0317159 A1* | 11/2018 | Frenger | H04W 48/16 |
| 2018/0337721 A1* | 11/2018 | Miranda | H04W 48/20 |
| 2019/0053286 A1 | 2/2019 | Cho et al. | |
| 2019/0132880 A1* | 5/2019 | Byun | H04B 7/0695 |
| 2019/0253116 A1* | 8/2019 | Priyanto | H04W 74/0833 |
| 2019/0313391 A1 | 10/2019 | Lin | |
| 2020/0107372 A1* | 4/2020 | Agiwal | H04W 80/02 |
| 2020/0252977 A1* | 8/2020 | Zhang | H04L 27/261 |
| 2020/0267770 A1* | 8/2020 | Islam | H04W 72/046 |
| 2020/0314595 A1* | 10/2020 | Hayes | H04W 4/02 |
| 2020/0383103 A1* | 12/2020 | Zhou | H04B 7/02 |

OTHER PUBLICATIONS

Anonymous, "5G NR Cell Search and Synchronization—Techplayon", Retrieved from the Internet at: <URL:http://www.techplayon.com/5g-nr-cell-search-and-synchronization-acguiring-system-information/> (Mar. 12, 2021).

* cited by examiner

US 11,076,372 B1

SYSTEMS AND METHODS FOR ACCESSING AN AIR-TO-GROUND NETWORK

TECHNICAL FIELD

The following disclosure relates to systems and methods for accessing an air-to-ground network, and more particularly, for synchronizing network access between a vehicle and a ground base station.

BACKGROUND

Ground base stations in an air-to ground network often are associated with a large footprint. Additionally, in many air-to-ground networks, each individual base station is serving relatively few vehicles. Accordingly, air-to-ground networks that implement antenna steering techniques need to know where to steer the antenna in order to communicate with vehicles located within the footprint.

One solution is to utilize a secondary network that does not rely upon antenna steering techniques for location determination. However, secondary networks are not universally implemented. Moreover, this creates additional dependencies for the air-to-ground network associated with additional points of failure. Accordingly, to improve the stability of air-to-ground networks that implement antenna steering techniques, there is a need for systems and methods for accessing an air-to-ground network that do not rely upon a secondary network.

SUMMARY OF THE DISCLOSURE

In one embodiment, a method for a vehicle to establish a connection with a base station is provided. The method includes (1) determining, by the one or more processors, a number of subsectors by which a spatial sector served by the base station is divided; (2) corresponding, by the one or more processors, the subsectors to respective non-overlapping sets of random access sequences; (3) receiving, from the base station, a sync message that includes an identifier of the base station; (4) determining, by the one or more processors, a particular subsector in which the vehicle is located based upon a relative location between the vehicle and the base station; (5) based on the determined subsector, identifying, by one or more processors, a particular set of random access sequences; and (6) transmitting, to the base station, a random access channel (RACH) preamble message, wherein the RACH preamble message includes a particular random access sequence from within the particular set of random access sequences corresponding to the particular subsector.

In another embodiment, a method for a base station to establish a connection with a vehicle is provided. The method includes (1) corresponding, by one or more processors, subsectors of the base station to respective non-overlapping sets of random access sequences; (2) broadcasting a sync message that includes an identifier of the base station; (3) receiving, from the vehicle, a random access channel (RACH) preamble message that includes a random access sequence; (4) identifying, by the one or more processors, a particular subsector of the base station corresponding to the random access sequence included in the RACH preamble message; (5) activating, by the one or more processors, a narrowbeam directed at the particular subsector; and (6) transmitting, to the vehicle via the narrowbeam, a RACH response (RAR) message.

In still another embodiment, a method for a base station to establish a connection with a vehicle is provided. The method includes (1) dividing, by one or more processors, a sector of the base station into a plurality of subsectors; (2) configuring, by the one or more processors, an antenna array to associate the plurality of subsectors with a respective narrowbeam; (3) broadcasting, by the one or more processors, a sync message that includes an identifier of the base station; (4) receiving, from the vehicle, a random access channel (RACH) preamble message that includes a random access (RA) sequence; (5) sequentially activating, by the one or more processors, the narrowbeams associated with the plurality of subsectors; (6) when a particular narrowbeam associated with a particular subsector is activated, (i) determining that the RA sequence included in the RACH preamble message corresponds to the particular subsector, and (ii) in response to the determination, broadcasting, over the particular narrowbeam, a RACH response (RAR) message; (7) receiving, from the vehicle, a radio resource control (RRC) connection request; and (8) associating, by the one or more processors, the vehicle with the subsector corresponding to the narrowbeam that was active when the RAR message was transmitted.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

As it is generally used herein, "synchronization" refers to the process of establishing a communication link between a vehicle and a base station. For example, the communication link may be a long term evolution (LTE) or a new radio (NR)/fifth generation (5G) communication link. While LTE and NR communication protocols set forth procedures on how to establish the connection, if the distance between the base station and the vehicle is large enough, the base station and the vehicle need to know each other's respective locations in order to be able to send and receive the messages set forth by the protocols. Because base stations are generally stationary, a base station database that associates base station identifiers and their geographic locations can be stored on the vehicle. Thus, when a vehicle receives a message from the base station, the vehicle is able to query this database to determine how to orient the vehicle antennas for communication back to the base station. However, vehicles are not generally stationary. Thus, the communication system may implement the presently disclosed techniques in order to orient the base station antennas for communication with the vehicle.

Figure 1:
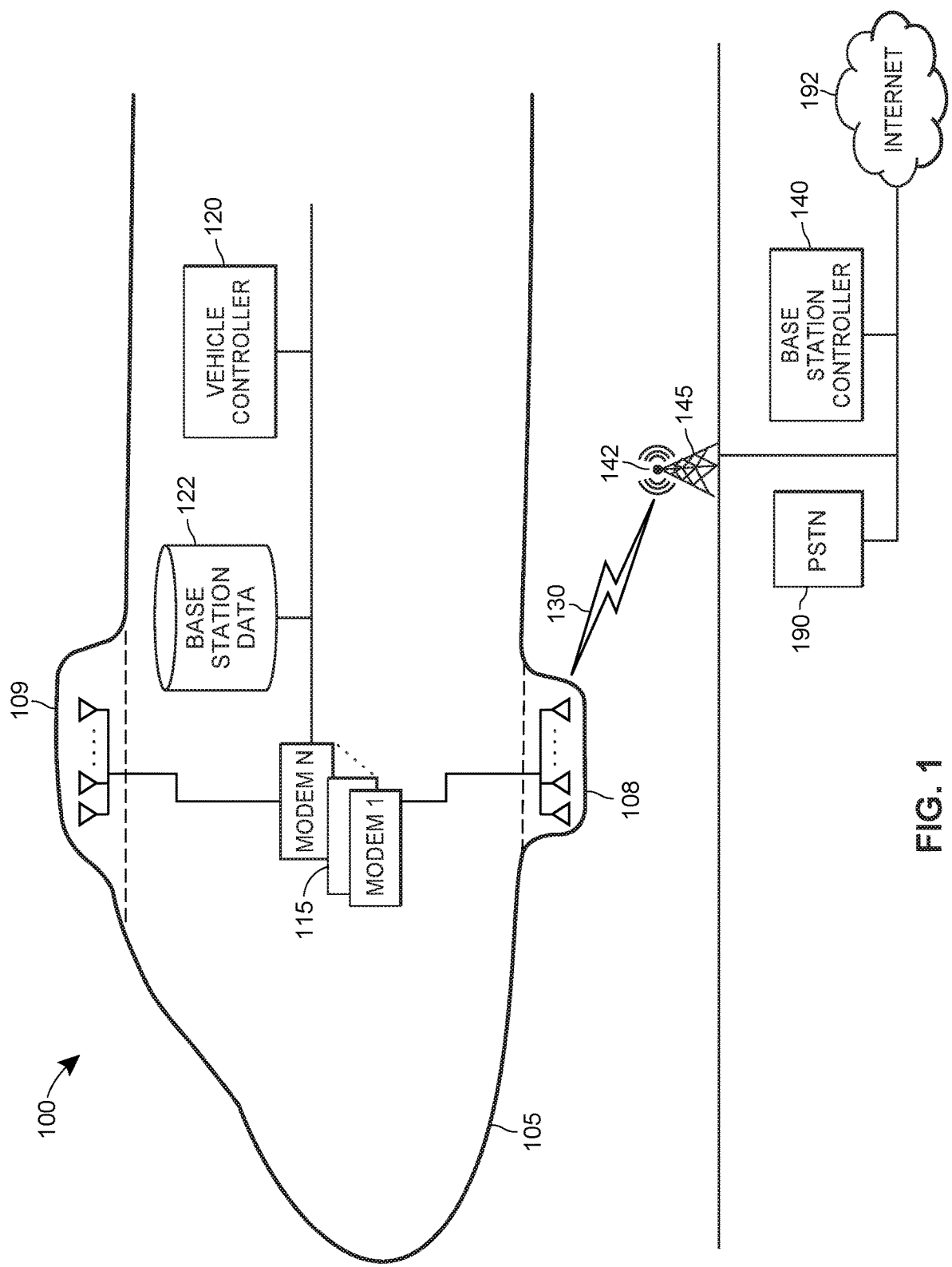
FIG. 1 depicts an embodiment of an exemplary communication system capable of performing one or more of the synchronization techniques disclosed herein.

FIG. 1 depicts an environment 100 that includes of an example communication system capable of performing the vehicle-base station synchronization techniques described herein. The environment 100 may include a vehicle 105 in communication with a base station 145 via a communication link 130. Although the vehicle 105 are depicted as airplanes, it is envisioned that the vehicle 105 may be any vehicle, for example, a bus, a train, a subway, a helicopter, a ship, a subway, a balloon, etc. Further, although FIG. 1 only illustrates a single vehicle 105, in other embodiments, the environment may include any number of vehicles configured to perform the synchronization techniques described herein. As illustrated, the vehicle 105 is equipped with a vehicle controller 120 that supports communications external to the vehicle 105 via the communication link 130.

The vehicle controller 120 is coupled to a base station database 122 configured to store information about the base station 145 (as well as any other base station included in the communication network). For example, the base station database 122 may include a data table that associates a base station identifier with a geographic position of the corresponding base station. To this end, communications received from the base station 145 may be configured to include the base station identifier corresponding to the base station 145. As will be explained below, the data tables of the base station database 122 may include a field that associates sectors of the base station 145 with respective random access (RA) sequences utilized during the synchronization process. In some embodiments, the base station database 122 includes a master mapping of subsectors to RA sequences based on relative positioning of the base station sectors. In other embodiments, the base station database 122 may associate base stations with varying mappings of subsectors to RA sequences.

Additionally, the vehicle controller 120 may be operatively connected to one or more modems 115 configured to support communications via transceivers 108 and 109. For example, the modems 115 may be configured to support respective communication protocols (e.g., TDMA, GSM, CDMA, GSM, LTE, WiMAX, NR, Wi-Fi, etc.) at respective frequency bands (e.g., $K_a$ band, $K_u$ band, L band, S band, Cellular band, AWS Band, PCS band, an unlicensed band, etc.). In the illustrated embodiment, the transceivers 109 may be adapted for communication via one or more satellite communication links (e.g., using a modem 115 that supports satellite communication frequency bands) and the transceivers 108 may be adapted for communication with the base station 145 via the communication link 130.

In some embodiments, the transceivers 108 include a phased antenna array configured to produce a beamform directed at the base station 145. For example, after the vehicle 105 and the base station 145 are synchronized, the vehicle controller 120 may determine a relative position between the vehicle 105 and the base station 145. Based on the relative position, the transceiver 108 may be configured to produce a beamform that has a large amount of gain directed at the location of the base station 145.

Similarly, the base station 145 includes a base station controller 140 configured to control operation of an antenna 142 thereat. As illustrated, the base station 145 is connected to a public switched telephone system (PSTN) 190 and the internet 192 (which may include voice over internet protocol (VOIP) networks). Accordingly, any data the base station 145 receives from the vehicle 105 can be routed to an indicated destination external to the communication network. Additionally, the base station 145 may be configured to receive communications from the internet 192 and/or the PSTN 190 for forward link communication to the vehicle 105 via the communication link 130.

In some embodiments, the antenna 142 is a phased antenna array configured to be electronically and/or mechanically steered by the base station controller 142. To this end, the base station controller 140 may be configured to control the antenna 142 to produce one or more beamforms. For example, the base station controller 140 may control the antenna 142 to produce a widebeam that spreads the transmit power of a relatively large range of angular values (such as an entire sector, or 60° in a typical six-sector base station) or a narrowbeam that focuses the transmit power over a relative smaller range of angular values (such as 8.75° if a 60° sector is divided into eight subsectors). It should be appreciated that due to the narrow distribution of the transmit power, the vehicle 105 senses a larger receive power via the narrowbeam. Therefore, a narrowbeam communication link 130 is better able to support large volumes of data (such as those associated with supporting traffic by personal electronic devices connected to an in-cabin network of the vehicle 105). On the other hand, because the widebeam antenna is broadcast over the entire sector, the base station controller 140 may be configured to route initial synchronization signalling is over a widebeam to be able to communicate with the vehicle 105 regardless of the location at which the vehicle 105 enters the sector of the base station 145. To this end, the initial synchronization signalling generally requires less bandwidth than traffic and does not necessarily require the additional receive power associated with narrowbeam communications.

Accordingly, to support the higher data rates associated with narrowbeam communications, the base station controller 140 needs to determine the relative position of the vehicle 105 to communicate with the vehicle 105 via a narrowbeam covering only a portion of a sector. In a first technique, the communication system defines non-overlapping sets of RA sequences (also referred to as a "random access channel (RACH) preamble sequence") and corresponds each set of RA sequences to a predetermined subsector. For example, if the communication system divides each sector into eight subsectors, the communication may divide the RA sequences into eight different non-overlapping sets. The communication system may then correspond each set of RACH preamble messages to a subsector based on the relative positioning of the subsectors (e.g., the first subsector clockwise azimuthally corresponds to the first set of RACH preambles, the second subsector azimuthally clockwise from north corresponds to the second set of RACH preambles, and so on). Accordingly, both the vehicle 105 and the base stations 145 store an indication of the correspondence between RA sequences and subsectors.

Figure 2A:
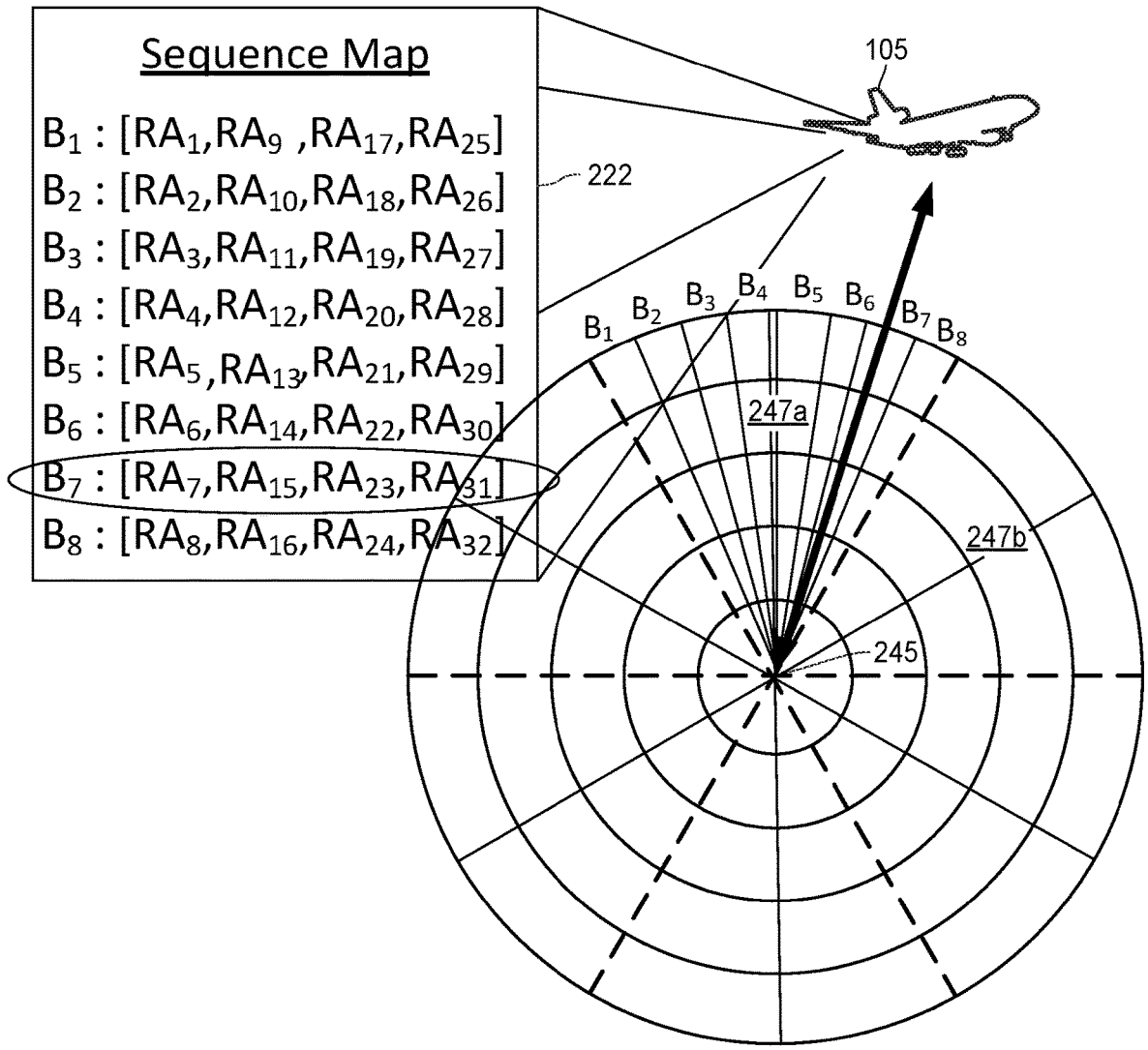
FIG. 2A illustrates an example process in which a particular random access sequence is selected by a vehicle to establish communications with a base station, which may be implemented in the communication system of FIG. 1.

Referring now to FIG. 2A, illustrated is an example process in which a particular random access sequence is selected by a vehicle 205 (such as the vehicle 105 of FIG. 1) to establish communication with the base station 245 (such as the base station 145 of FIG. 1). As illustrated, the base station 245 divides each sector 247 into eight subsectors B1-B8 positioned clockwise azimuthally from one another. It should be appreciated that while FIG. 2 only depicts the subsectors for the sector 247a, each of the other sectors 247 may be similarly divided into subsectors.

The vehicle 205 includes a sequence mapping 222 that corresponds each of the subsectors B1-B8 with respective RA sequences. In the illustrated embodiment, there are 32 RA sequences divided between the subsectors, but, other examples, there may be more or fewer RA sequences. The sequence mapping 222 may be stored at the base station database 122 of FIG. 1. Accordingly, when the vehicle 205 selects a RA sequence to include in a registration message, the vehicle 205 may determine the subsector in which the vehicle is positioned and randomly select a sequence from the corresponding set of RA sequences. In the illustrated scenario, the vehicle is located in subsector B7 and random selects one of $RA_7$, $RA_{15}$, $RA_{23}$, and $RA_{31}$. Accordingly, when the vehicle 205 transmits a RACH message that includes the selected RA sequence, the base station 245 is able to query its copy of the sequence mapping 222 to determine the relative location of the vehicle 205.

Figure 2B:
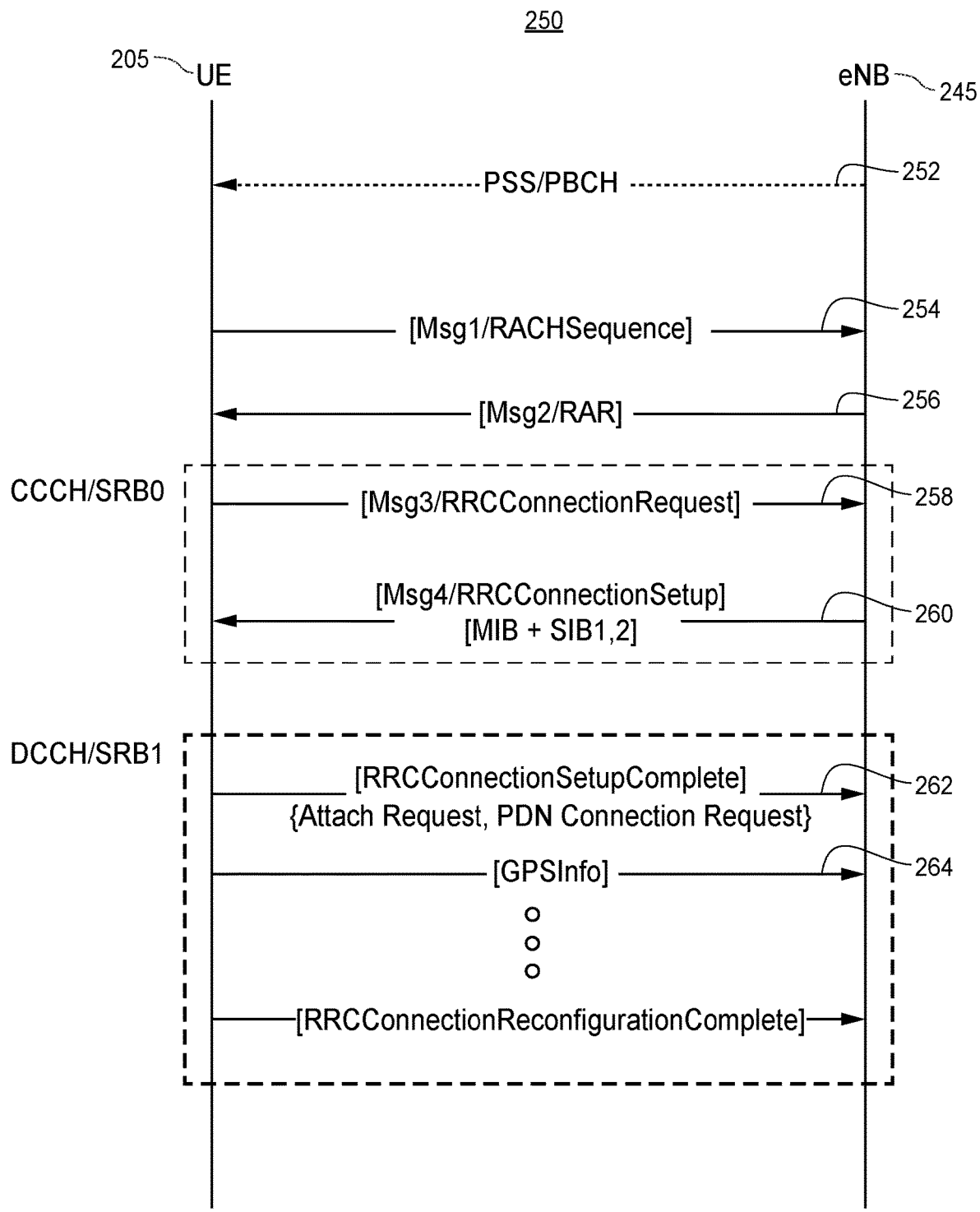
FIG. 2B illustrates an example signal diagram that implements the random access sequence selection process of FIG. 2A.

FIG. 2B illustrates an example signal diagram 250 that implements the random access sequence selection process of FIG. 2A. In the signal diagram, the user equipment (UE) is the vehicle 205 (or, more particularly, a vehicle controller of the vehicle 205, such as the vehicle controller 120 of FIG. 1) and the evolved node B (eNB) is the base station 245.

As illustrated, the signal diagram 250 begins when the base station 245 transmits synchronization signals 252, such as a synchronization signal block (SSB) 252 that includes a physical broadcast channel (PBCH), a primary sync signal (PSS), and a secondary sync signal (SSS). As is known in the art, the combination of the PSS and SSS form the physical cell identifier (PCI) that is assigned to the base station 245 during network planning. Additionally, the PBCH message includes an indication of the system frame name (SFN) to indicate to the vehicle 205 the current frame number at the base station 245. In the illustrated example, the base station 245 periodically transmits the synchronization signals 252 over a widebeam covering the sector 247a. Accordingly, when the vehicle 205 enters the sector 247a, the vehicle 205 is able to determine the base station identifier to query the base station database for a physical location of the base station 245 and the synchronization information needed to respond to the synchronization signals 252.

In response to receiving the synchronization signals 252, the vehicle 205 replies with "Msg1" or a RACH preamble sequence message 254 that includes an indication of a particular RA sequence. As described with respect to FIG. 2A, the vehicle 205 utilizes the PCI information to determine the relative position of the vehicle 205 with respect to the base station 245 to identify the particular subsector B1-B8 in which the vehicle 205 is located. Accordingly, the vehicle 205 formats the Msg1 254 to include a RA sequence randomly selected from the set of RA sequences corresponding to current subsector (which is B7 in the scenario illustrated in FIG. 2A). Thus, upon receiving the Msg1 254, the base station 245 can query the RA sequence mapping to identify the particular subsector in which the vehicle 205 is located.

The base station 245 is configured to respond to the Msg1 254 by transmitting a "Msg2" or a random access response (RAR) message 256. More particularly, the base station 245 is configured to transmit the Msg2 over a narrowbeam that covers the subsector corresponding to the RA sequence included in the Msg1 254. The Msg2 256 may be configured to include a timing advance (TA) to account for the timing offset to transmit the signals between the vehicle 205 and the base station 245 and a resource grant for the vehicle 205 to subsequently transmit a radio resource control (RRC) connection request.

The vehicle 205 then transmits the RRC connection request or "Msg3" 258 in accordance with the grant included in the Msg2 256. The Msg3 258 may be configured to include various identifier associated with vehicle 205 used to authenticate the vehicle 205 with the communication system. Assuming that the vehicle 205 is properly authenticated, the base station 245 replies with a RRC connection setup or "Msg4" 260 that includes configuration information needed for the vehicle 205 to establish an RRC connection with the base station 245. After configuring a communication module (e.g., a modem 115 of FIG. 1) with the RRC configuration information included in the Msg4 260, the vehicle 205 responds with a RRC connection setup complete message 262 to inform the base station 245 that the vehicle 205 is properly synchronized with the base station 245.

At this point, the vehicle 205 is synchronized with the base station 245 and is able to request establishment of a packet data network (PDN) connection (e.g., a user plane connection). Accordingly, the vehicle 205 may periodically request a PDN connection to transmit location information to the base station 245. For example, the location information may include an azimuth angle (e.g., the azimuth relative to the sector 247a), a latitude and longitude pair, a GPS coordinate, and/or other location identifiers obtain from a locationing sensor on-board the vehicle 205. Based on this location information, the base station 245 is able to track the location of the vehicle 205 as it traverses the footprint of the base station 245. Thus, the base station 245 can transmit subsequent forward link communications to the vehicle 205 over a different narrowbeam as the vehicle enters a different subsector of the base station 245.

Figure 3A:
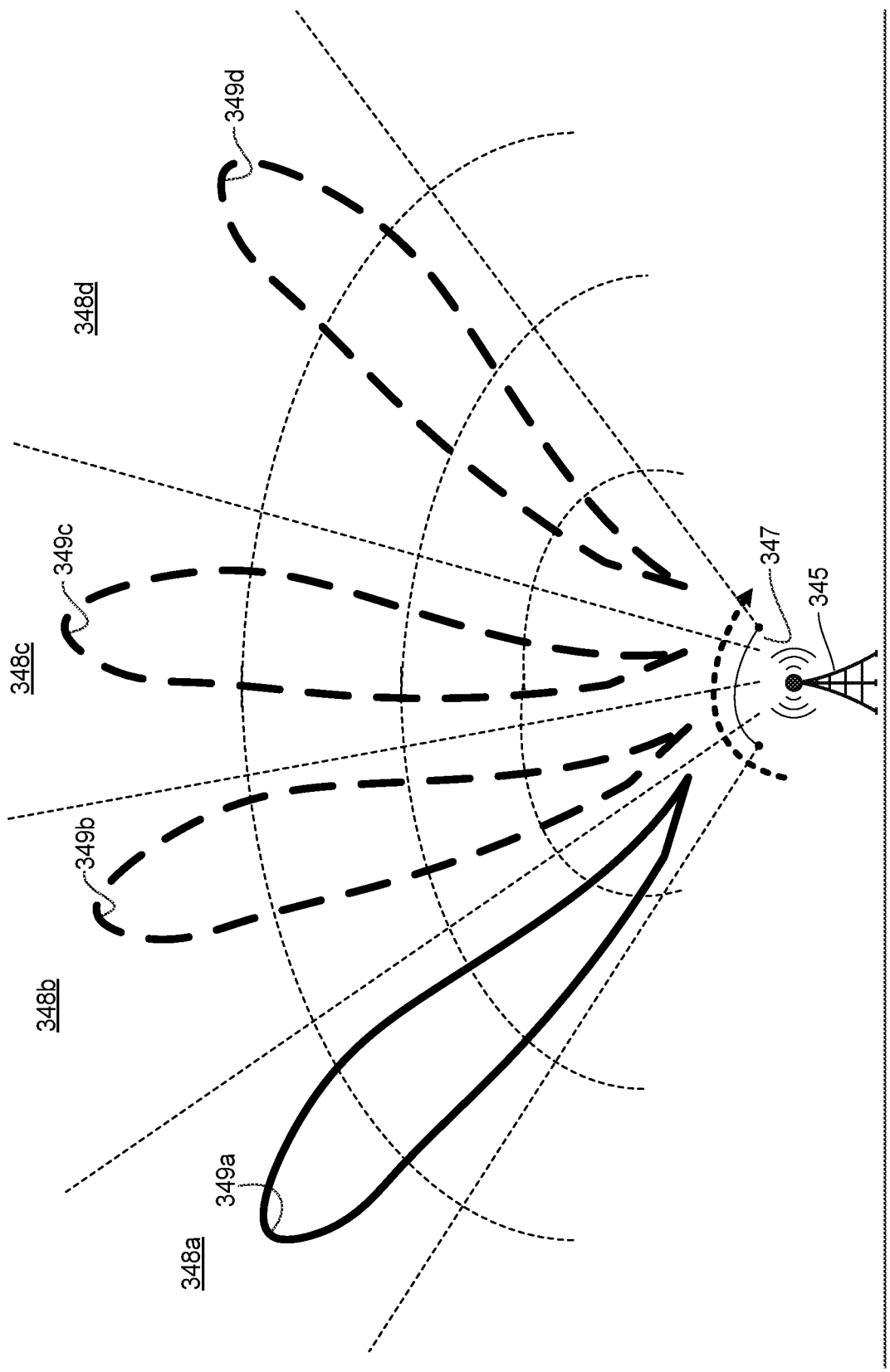
FIG. 3A illustrates a base station sequentially activating beams associated with a plurality of sectors, which may be implemented in the communication system of FIG. 1.

In a second technique to determine the vehicle location, the base station transmits messaging over sequentially activated narrowbeams to detect a particular narrowbeam that is active when a response is received. More particularly, referring now to FIG. 3A, illustrated is an example process in which a base station 345 (such as the base station 145 of FIG. 1) sequentially activates narrowbeams 349. In some embodiments, the second technique may be applied to establish the forward link from the base station 345. In these embodiments, minimum mean square error (MMSE) techniques may be used for receiving reverse link communications from vehicles within the footprint of the base station 345. As illustrated, the base station 345 divides a sector 347 into four subsectors 348a-d positioned clockwise azimuthally from one another. It should be appreciated that while FIG. 3 depicts the base station 345 dividing the sector 347 into four subsectors 348, in other embodiments, the base station 345 may divide the subsector into more or fewer subsectors 348.

In some embodiments, to produce the narrowbeams the base station 345 may include a gain profile associated with each of the narrowbeams 349 such that the narrowbeams 349 are configured to maximize the gain in the direction of the corresponding subsector 348. In the illustrated example, the gain profile for the narrowbeam 349a maximizes the gain in the direction of the subsector 348a, the gain profile for the narrowbeam 349b maximizes the gain in the direction of the subsector 348b, and so on. Accordingly, a base station controller (such as the base station controller 140 of FIG. 1) may be configured to reconfigure a phased antenna array to cycle through the gain profiles associated with the narrowbeams 349. In other embodiments, the base station 345 includes separate antennas directed at corresponding subsectors 348. In these embodiments, the base station 345 may be configured to activate the corresponding antenna (and deactivate other antennas) to activate a particular narrowbeam. While the illustrated embodiment depicts the base station 345 sequentially activating the narrowbeams 349 in a clockwise manner, in other embodiments, the base station 345 may sequentially activate the narrowbeams 349 in a counterclockwise manner or interleave the activation of the narrowbeams 349 (e.g., activating the narrowbeam 349a, 349c, 349b, then 349d).

Figure 3B:
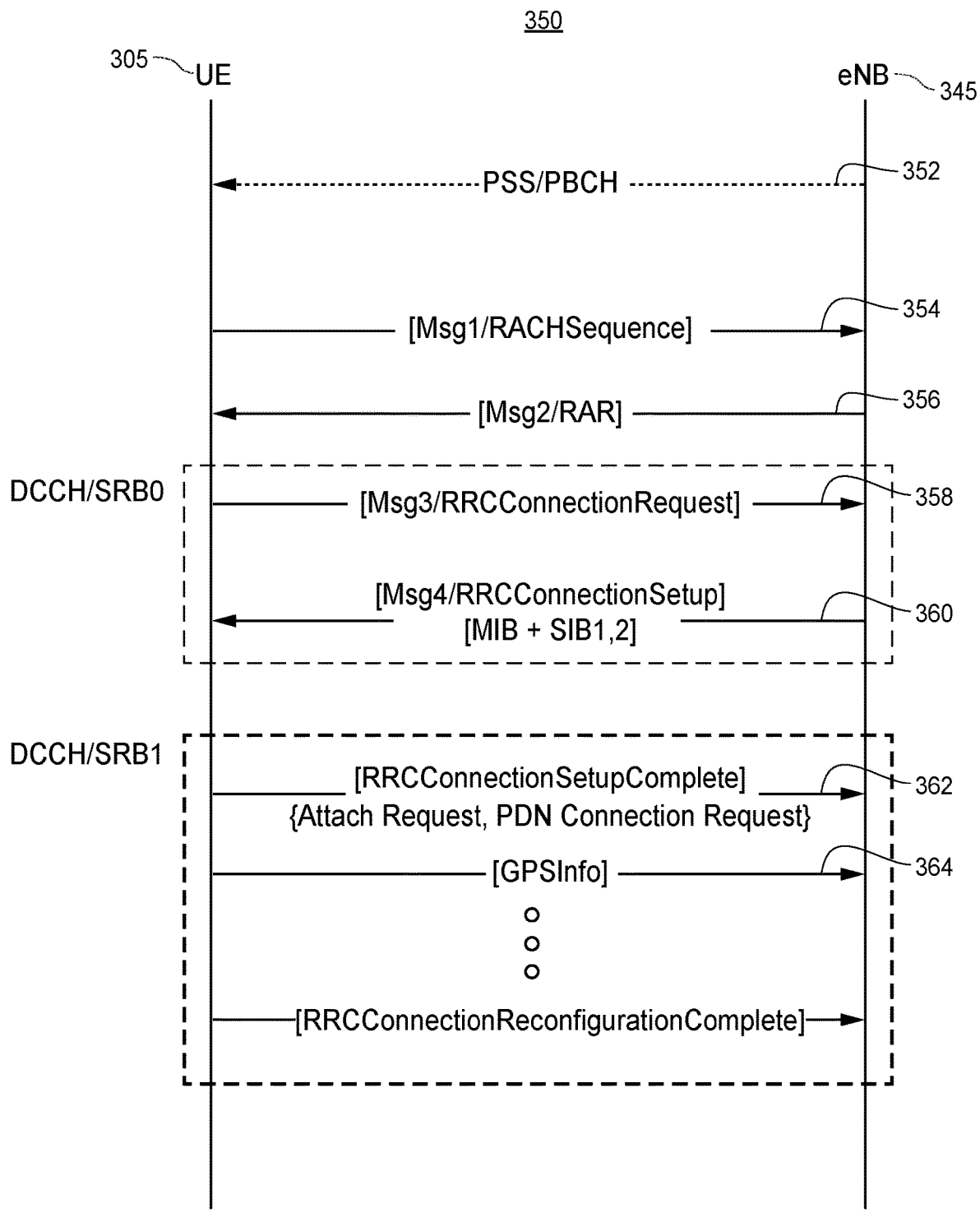
FIG. 3B illustrates an example signal diagram that implements the sequential activation process of FIG. 3A.

FIG. 3B illustrates an example signal diagram 350 that implements the sequential narrowbeam activation technique of FIG. 3A to determine a location of a vehicle 305 (such as the vehicle 105 of FIG. 1). In the signal diagram, the user equipment (UE) is the vehicle 305 (or, more particularly, a vehicle controller of the vehicle 305, such as the vehicle controller 120 of FIG. 1) and the evolved node B (eNB) is the base station 345.

Similar to the signal diagram 250, the signal diagram 350 begins when the base station 345 transmits synchronization signals 352, such as a synchronization signal block (SSB), that includes a PBCH, a PSS, and a SSS. In response to receiving the synchronization signals 352, the vehicle 305 replies with "Msg1" or a RACH preamble sequence message 354. Unlike in the signal diagram 250, the Msg1 354 does not include a particular RA sequence associated with a particular subsector 348 of the sector 347. Said another way, the RA sequence included in the Msg1 354 may be any of the available RA sequences. Thus, when the base station 345 receives the Msg1 354, the base station 345 still does not know the subsector 348 in which vehicle 305 is located for routing forward link communications.

Accordingly, the base station 345 is configured to transmit a Msg2 356 by sequentially activating the narrowbeams 349 in accordance with the techniques described with respect to FIG. 3A. More particularly, the base station 345 sequentially activates the narrowbeams 349 for a duration sufficient to receive a response from the vehicle 305. If the duration expires without the base station 345 receiving the response, the base station 345 activates the next sequential narrowbeam 349 and re-transmits the Msg2 356. On the other hand, when the base station 345 activates the narrowbeam 349 corresponding to subsector 348 in which the vehicle 305 is located is activated, the vehicle 305 can detect the Msg2 356 and respond with the Msg3 358. Thus, when the base station 345 detects the Msg3 358, the base station 345 associates the vehicle 305 with the current subsector 348.

Consequently, when the base station 345 responds with a Msg4 360, the base station 345 transmits the Msg4 360 over the narrowbeam 349 corresponding to associated subsector 348. After the vehicle 305 and the base station 345 are synchronized following the Msg4 360, the vehicle 305 requests establishment of a PDN connection 362 (e.g., a user plane connection). For example, the vehicle 305 may periodically request a PDN connection 362 to transmit location information to the base station 345. Based on this location information, the base station 345 is able to track the location of the vehicle 305 as it traverses the footprint of the base station 345. Thus, the base station 345 can transmit subsequent forward link communications to the vehicle 305 over a different narrowbeam 349 as the vehicle enters a different subsector 348 of the base station 345.

It should be appreciated that while the foregoing describes the base station 345 sequentially activating the narrowbeams 349 to transmit the Msg2 356, in other implementations, the base station 345 instead sequentially activates the narrowbeams 349 to transmit the SSB 352. Accordingly, when the base station 345 detects the Msg1 354, the base station 345 may associate the vehicle 305 with the particular narrowbeam 349 via which the SSB 352 was transmitted. Thus, in these embodiments, when the base station 345 transmits the Msg2 356, the base station 345 transmits the Msg2 356 via the particular narrowbeam 349 associated with the vehicle 305.

Figure 4A:
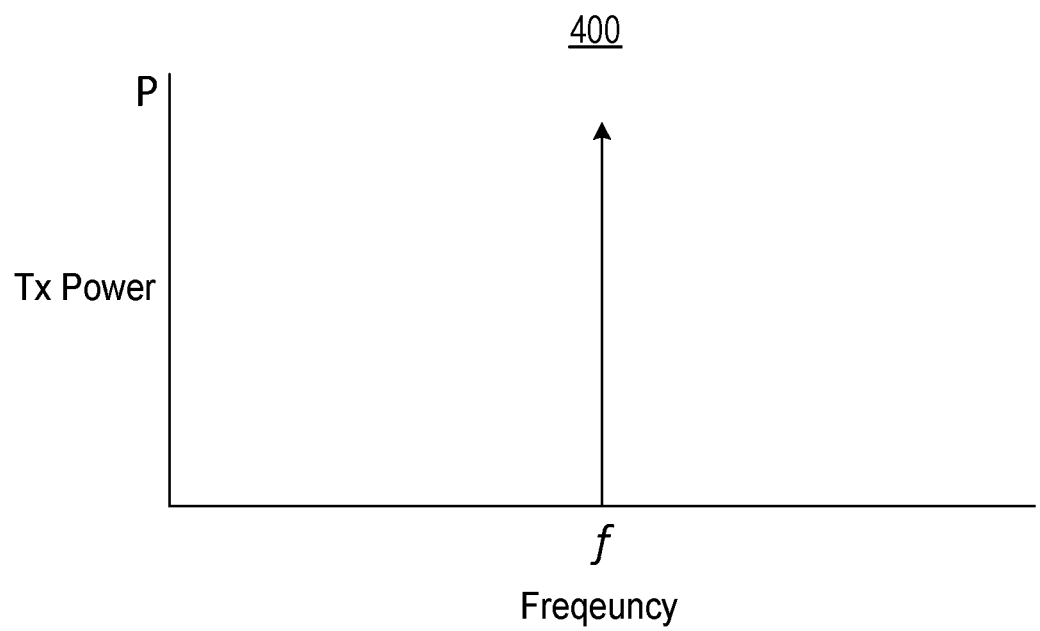
FIGS. 4A-4B illustrate a base station dividing the transmit power for a beam between multiple frequency carriers, which may be implemented in the communication system of FIG. 1.
Figure 4B:
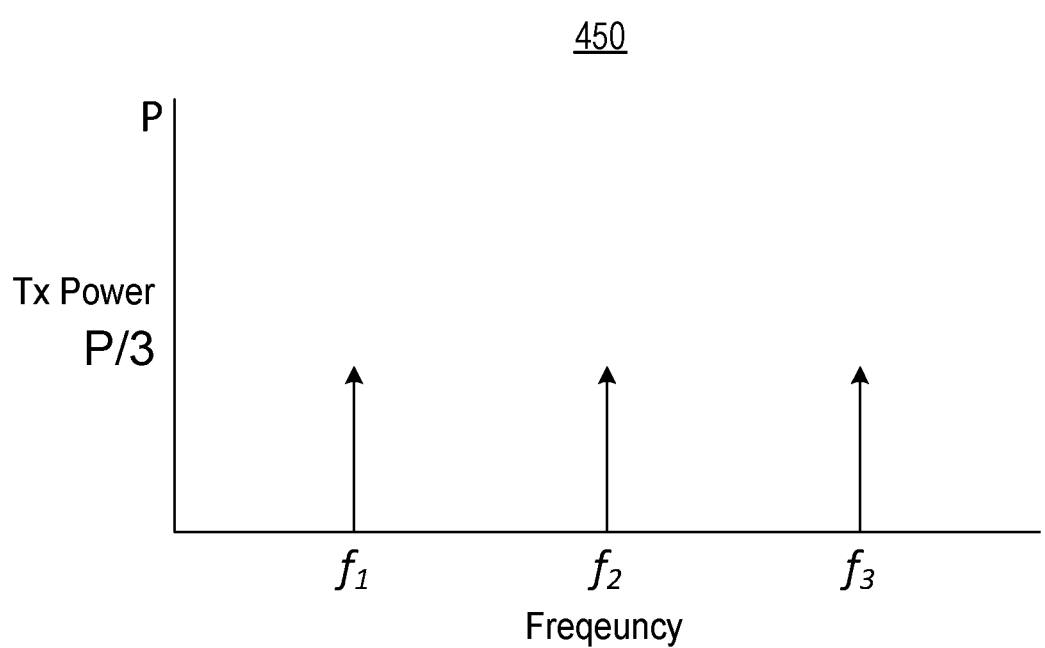

FIGS. 4A-4B illustrate a base station dividing the transmit power for a beam between multiple frequency carriers, which may be implemented in the communication system of FIG. 1. Due to regulatory requirements and/or carrier-specific link budget constraints, a base station (such as the base station 145 of FIG. 1) generally has a maximum effective radiated power (ERP) for forward link communications to a vehicle (such as the vehicle 105 of FIG. 1). Accordingly, in the plot 400 of FIG. 4A, the base station focuses all of the gain into a single frequency carrier f. As a result, when the base station transmits message via a single-carrier widebeam, the gain difference between the widebeam communications and the narrowbeam communications is lessened. Therefore, vehicles that are farther from the base station are more likely to detect the widebeam signal when a single carrier is used. This is useful when transmitting the initial synchronization messaging, such as synchronization signals 252 and 352 and/or the Msg2 256 and 356 of FIGS. 2 and 3, respectively.

That said, many communication systems employ multiple carriers that are available for communications between base stations and user equipment. Accordingly, if the vehicle is configured to support multiple carriers, the vehicle may not be tuned to the frequency f when entering the footprint of the base station. Thus, the base station may be configured to cycle between the supported carriers when broadcasting the initial synchronization messaging.

Alternatively, as shown in the plot 450 of FIG. 4B, the base station may use a widebeam to broadcast the synchronization messaging over each of the carriers f1, f2, and f3 simultaneously. In these embodiments, the vehicle is more likely to be tuned to the transmit carrier to be able to detect the broadcast messaging and respond accordingly. However, due to the regulatory ERP limits, the transmit power used for each individual carrier is proportionally less than the maximum transmit power.

Figure 5:
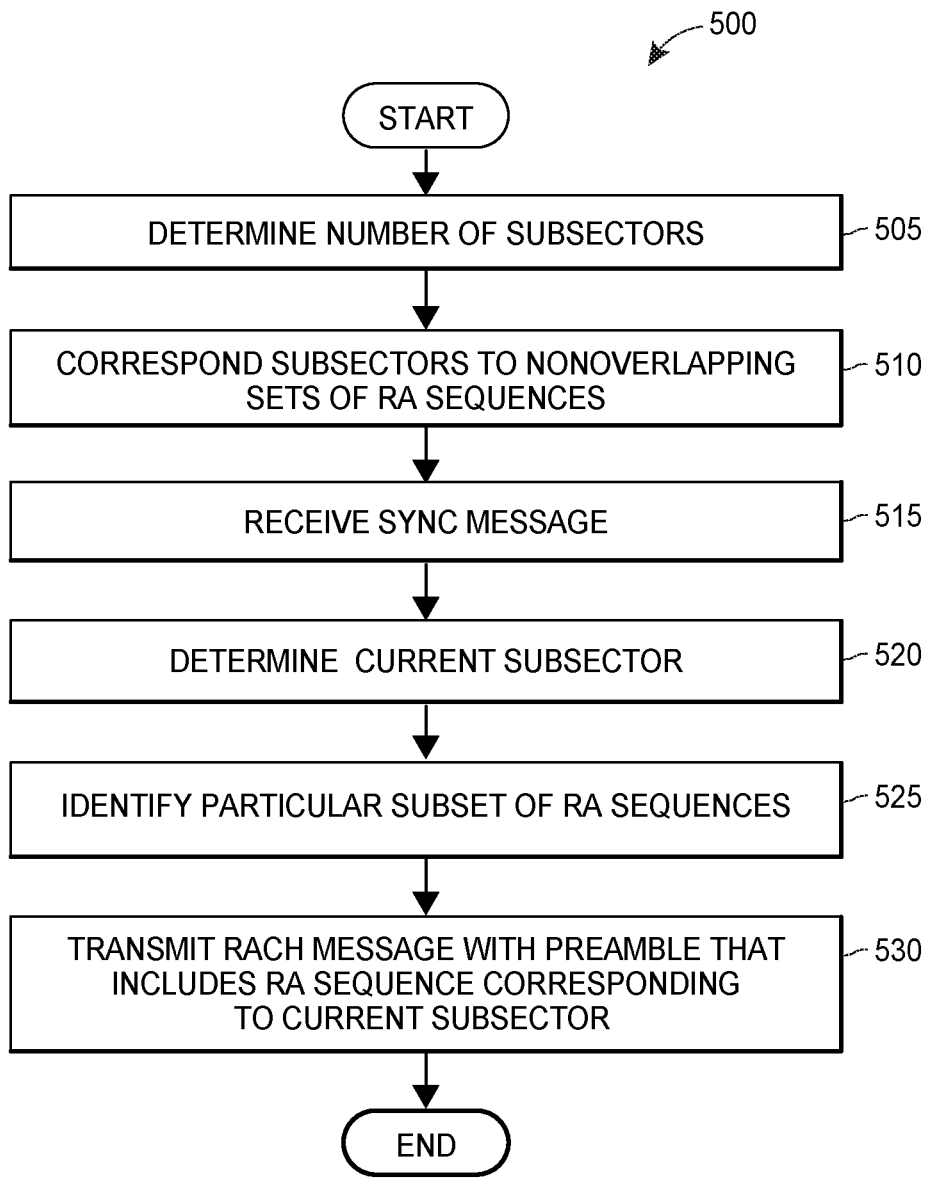
FIG. 5 is a flow diagram of an example method for a vehicle establishing communications with a base station, which may be implemented in the communication system depicted in FIG. 1.

FIG. 5 is a flow diagram 500 of an example method for a vehicle (such as the vehicle 105 of FIG. 1) establishing communications with a base station (such as the base station 145 of FIG. 1). In particular, the method may be performed by one or more processors of a vehicle controller (such as the vehicle controller 120 of FIG. 1) of the vehicle.

The flow diagram 500 begins at block 505 where the vehicle determines a number of subsectors by which a spatial sector served by the base station is divided. As part of the communication system via which the vehicle and the base station are in communication, the sectors of the base station are divided into pre-determined number of subsectors (e.g., four, six, eight, twelve). In some embodiments, this number may be programmed into the vehicle controller as part of a configuration file that enables the vehicle to communicate over the communication network that includes the base stations. In other embodiments, the determination is based on the number of RA sequence sets stored in a memory at the vehicle.

At block 510, the vehicle corresponds the subsectors to respective non-overlapping subsets of the set of RA sequences. For example, as described with respect to FIG. 2A, set of the available RA sequences may be divided between the subsectors of the base station. In some embodiments, the communication system provides a consistent correspondence between the subsectors and the set of RA sequences such that the correspondence is maintained regardless of the particular location of the vehicle within the communication network. As an example, the first azimuthally clockwise subsector in each sector may correspond to a first set of RA sequences. Accordingly, the vehicle may store the correspondence between subsectors and sets of RA sequences in a memory thereat.

At block 515, the vehicle receives, from the base station, a sync message (such as the synchronization signals 252 and 352 of FIGS. 2B and 3B, respectively) that includes an identifier of the base station. For example, the sync message may be a SSB message that includes the PSS and PBCH messaging. In some embodiments, the base station is configured to periodically broadcast the sync message via a widebeam transmission. In other embodiments, the base station is configured to broadcast the sync message via sequentially activated narrowbeam transmissions. Regardless, the vehicle detects the sync message shortly after entering a sector of the base station.

At block 520, the vehicle determines a particular subsector in which the vehicle is located based upon a relative location between the vehicle and the base station. In some embodiments, the vehicle includes a base station database (e.g., a network map) that includes the geographic location of base stations within the communication network and the orientation of the respective sectors thereof. Accordingly, the vehicle may query the base station database using the base station identifier included in the received sync message to determine the geographic location of the base station. The vehicle may then obtain location data generated by a vehicle location sensor and compare the obtained location data to the queried location of the base station to determine the relative location between the vehicle and the base station. Based on the relative location and the sector orientations included in the base station database, the vehicle determines the particular subsector in which the vehicle is located.

At block 525, the vehicle identifies a particular set of RA sequences based on the determined subsector corresponding to the vehicle's current location. For example, if the vehicle determines that the vehicle is located in the fifth azimuthally clockwise subsector, the vehicle may identify the set of RA sequences based on the correspondence performed at block 510.

At block 530, the vehicle transmits to the base station, a random access channel (RACH) preamble message (such as the RACH/Msg1 254 of FIG. 2B) to the base station. More particularly, the vehicle configures the RACH preamble message to include a particular RA sequence from within the particular set of RA sequences identified at block 525. In some embodiments, the vehicle randomly selects a particular RA sequence from the particular set of RA sequences.

Because the base station also knows the correspondence between subsectors and sets of RA sequences, the base station knows the location of the vehicle upon reception of the RACH message. Accordingly, the base station can respond with the RAR message (such as the RAR/Msg2 256 of FIG. 2B) via a narrowbeam transmission. As a result, the vehicle is able to become synchronized with the base station using narrowbeam transmissions without implementing a complementary network. It should be appreciated that after the vehicle and the base station are synchronized, the vehicle can continue to update the base station with the vehicle's location via data communicated over a PDN connection. Accordingly, based on the location data communicated over the PDN connection, the base station can route forward link communications over the appropriate narrowbeam as the vehicle traverses the footprint of the base station.

Figure 6:
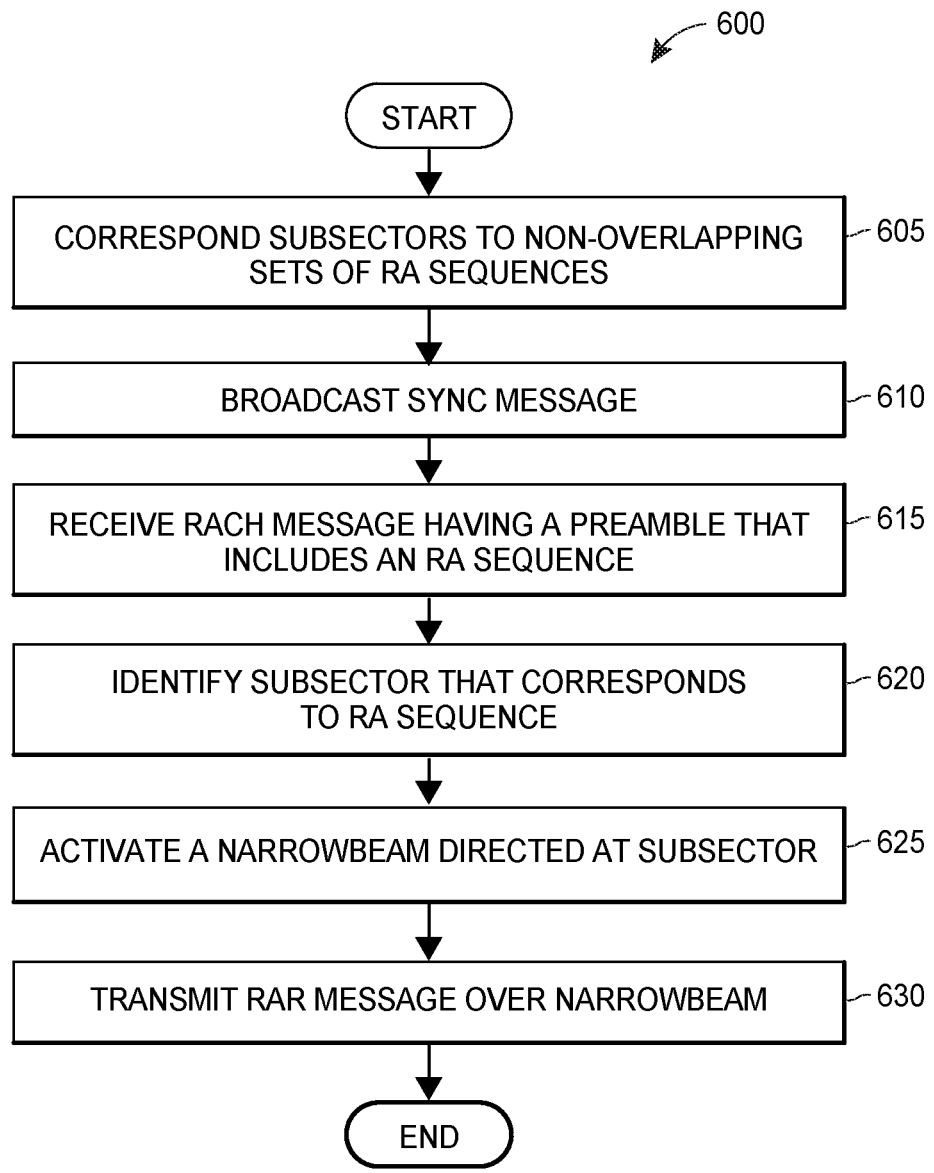
FIG. 6 is a flow diagram of an example method for a base station establishing communications with a vehicle, which may be implemented in the communication system depicted in FIG. 1.

FIG. 6 is a flow diagram 600 of an example method for a base station (such as the base station 145 of FIG. 1) establishing communications with a vehicle (such as the vehicle 105 of FIG. 1). In particular, the method may be performed by one or more processors of a base station controller (such as the base station controller 140 of FIG. 1) of the base station.

The flow diagram 600 begins at block 605 where the base station corresponds subsectors of the base station to respective non-overlapping sets of RA sequences. As described with respect to FIG. 2A, set of the available RA sequences may be divided between the subsectors of the base station. Fox example, the first azimuthally clockwise subsector in each sector may correspond to a first set of RA preamble sequences. Accordingly, the base station may store the correspondence between subsectors and sets of RA sequences in a memory thereat.

At block 610, the base station broadcasts a sync message (such as the synchronization signals 252 and 352 of FIGS. 2B and 3B, respectively) that includes an identifier of the base station. For example, the sync message may be a SSB message that includes the PSS and PBCH messaging. In some embodiments, the base station broadcasts the sync message via a widebeam that covers the sector of the base station. In other embodiments, the base station broadcasts the sync message by sequentially activating the plurality of narrowbeams covering a subsector of the sector and transmitting the sync message upon activating a particular narrowbeam.

Additionally, as described with respect to FIGS. 4A-4B, the base station may broadcast the sync message (via either a widebeam or a narrowbeam) using a single carrier or multiple carriers. In embodiments where the base station broadcasts the sync message using a single carrier, the base station may be configured to determine an available transmit power and broadcast the sync message over the single carrier at the determined available transmit power. In embodiments where the base station broadcasts the sync message over multiple carriers, the base station may be configured to divide the available transmit power between the multiple carriers and transmit the sync message using the respective divided transmit powers associated with each of the multiple carriers.

At block 615, the base station receives, from the vehicle, a RACH preamble message that includes an RA sequence. For example, the RACH preamble message may be the RACH/Msg1 254 of FIG. 2B.

At block 620, the base station identifies a particular subsector of the base station corresponding to the RA preamble sequence included in the RACH preamble message. To the end, the base station may be configured to compare the received RA sequence to the sets of RA sequences stored thereat. Based on the particular set of RA sequences in which the received RA preamble sequence is included, the base station is able to determine the particular subsector the vehicle is currently located.

At block 625, the base station activates a narrowbeam directed at the particular subsector. In some embodiments, the base station configures a phased antenna array with a gain profile directed towards the particular subsector. In other embodiments, the base station enables a connection to a particular antenna directed towards the particular subsector. It should be appreciated that in some embodiments, the narrowbeams only supports forward link communications. In these embodiments, the base station may implement MMSE techniques to detect reverse link communications (including the RACH preamble message).

At block 630, the base station transmits, to the vehicle via the narrowbeam, a RACH response (RAR) message. For example, the RAR message may be the RAR/Msg2 256 of FIG. 2B. The base station may then complete the synchronization process as described with respect to FIG. 2B using the particular narrowbeam for forward link communications. After the synchronization process, the vehicle may continue to update the base station with its location via a PDN connection. Accordingly, when routing forward link communications to the vehicle, the base station may be configured to activate the particular narrowbeam covering the location received via the PDN connection.

Figure 7:
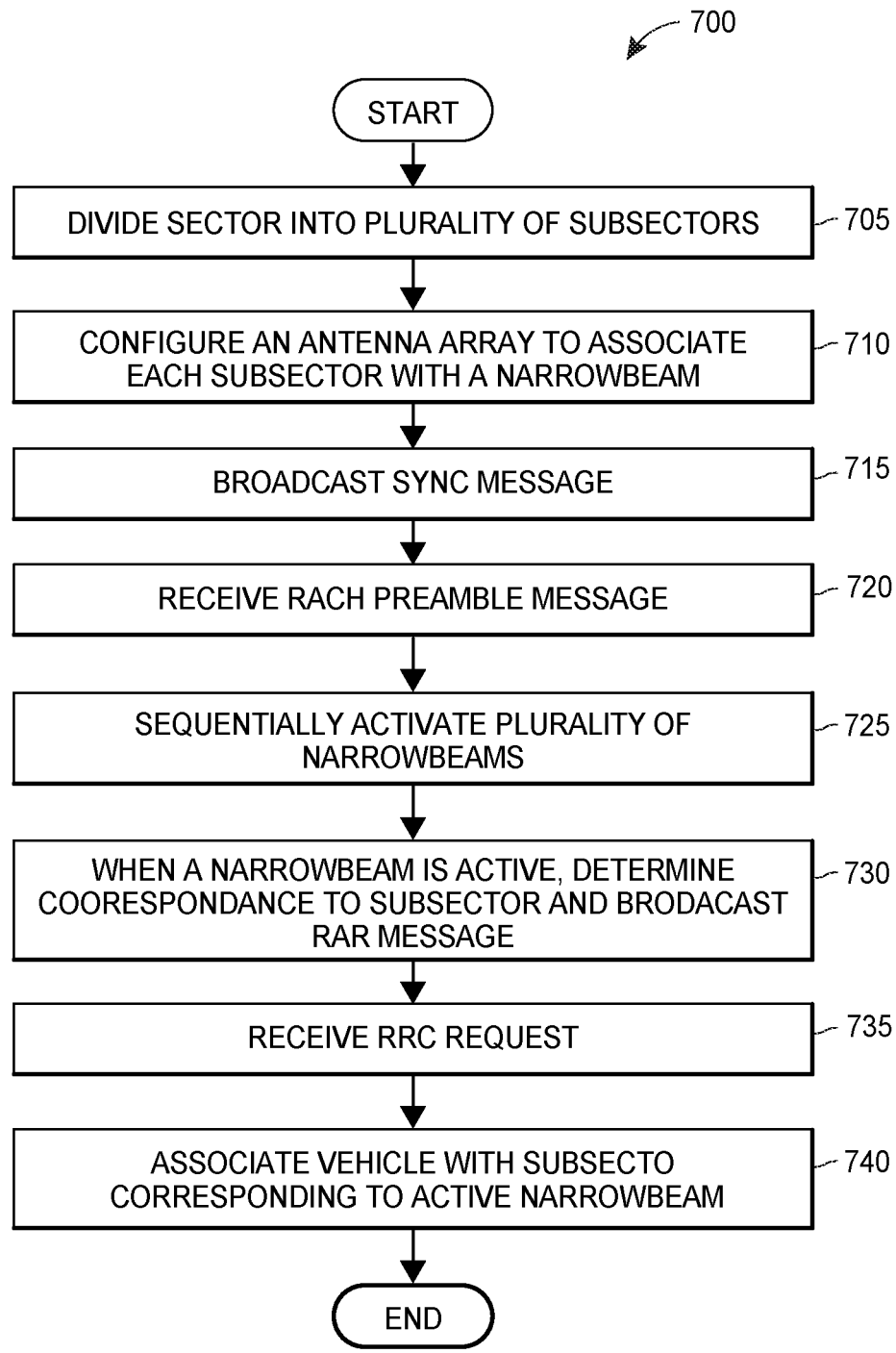
FIG. 7 is another flow diagram of an example method for a base station establishing communications with a vehicle, which may be implemented in the communication system depicted in FIG. 1.

FIG. 7 is a flow diagram 700 of an example method for a base station (such as the base station 145 of FIG. 1) establishing communications with a vehicle (such as the vehicle 105 of FIG. 1). In particular, the method may be performed by one or more processors of a base station controller (such as the base station controller 140 of FIG. 1) of the base station.

The flow diagram 700 begins at block 705 where the base station corresponds subsectors of the base station divides a sector of the base station into a plurality of subsectors. Similar to the flow diagram 600, the base station may correspond the subsectors with respective sets of RA sequences.

At block 710, the base stations configures an antenna array to associate the plurality of subsectors with a respective narrowbeam. In some embodiments, the base station associates each subsector with a gain profile directed towards the subsector. Accordingly, when the base station generates a narrowbeam covering a particular subsector, the base station accesses the corresponding gain profile and configures the antenna array in accordance with the gain profile.

At bock 715, the base station broadcasts a sync message (such as the synchronization signals 252 and 352 of FIGS. 2B and 3B, respectively) that includes an identifier of the base station. For example, the sync message may be a SSB message that includes the PSS and PBCH messaging. In some embodiments, the base station broadcasts the sync message via a widebeam that covers the sector of the base station.

At block 720, the base station receives, from the vehicle, a random access channel (RACH) preamble message. For example, the RACH preamble message may be the RACH/Msg1 354 of FIG. 3B. Unlike the flow diagram 600, the RACH preamble message may include any available RA sequence, not necessarily an RA sequence corresponding to the subsector in which the vehicle is located.

At block 725, the base station sequentially activates the narrowbeams associated with the plurality of subsectors. More particular, the base station may periodically reconfigure the antenna array based on the gain profiles associated with each subsector. In some embodiments, each narrowbeam is activated for a sufficient duration to transmit a message to a vehicle located at the edge of the footprint and to receive a response to the message from the vehicle.

More particularly, at block 730, when a particular narrowbeam associated with a particular subsector is activated, the base station determine that the RA sequence included in the RACH preamble message includes an RA sequence that corresponds to the particular subsector and broadcasts, over the particular narrowbeam, a RACH response (RAR) message. For example, the RAR message may be the RAR Message/Msg2 356 of FIG. 3B. If the vehicle is not located in the particular subsector covered by the active narrowbeam, the vehicle will not receive the RAR message. Accordingly, the base station will not receive a response to the RAR message. On the other hand, if the vehicle is located in the subsector covered by the particular narrowbeam, the vehicle is configured to reply to the RAR message with a RRC connection request. It should be appreciated that in some embodiments, the narrowbeams only supports forward link communications. In these embodiments, the base station may implement MMSE techniques to detect reverse link communications (including the RACH preamble message).

At block 735, the base station receives the RRC connection request from the vehicle. For example, the RRC connection request may be the RRC Connection Request/Msg3 358 of FIG. 3B. It should be appreciated that the base station may receive the RRC connection request when the particular narrowbeam is not active. For example, the base station may implement MMSE techniques during a receive period to detect the RRC connection request.

At bock 740, the base station associates the vehicle with the subsector corresponding to the narrowbeam that was active when the RAR message was transmitted. Because the vehicle can only respond to received messages, when the base station receives a response to the RAR message, the base station is able to determine that the vehicle is located in the subsector covered by the active narrowbeam. The base station may then complete the synchronization process as described with respect to FIG. 3B using the particular narrowbeam for forward link communications. After the synchronization process, the vehicle may continue to update the base station with its location via a PDN connection. Accordingly, when routing forward link communications to the vehicle, the base station may be configured to activate the particular narrowbeam covering the location received via the PDN connection.

Additionally, as described with respect to FIGS. 4A-4B, the base station may broadcast the RAR message (via either a widebeam or a narrowbeam) using a single carrier or multiple carriers. In embodiments where the base station broadcasts the RAR message using a single carrier, the base station may be configured to determine an available transmit power and broadcast the RAR message over the single carrier at the determined available transmit power. In embodiments where the base station broadcasts the RAR message over multiple carriers, the base station may be configured to divide the available transmit power between the multiple carriers and transmit the RAR message using the respective divided transmit powers associated with each of the multiple carriers.

While the foregoing describes configuring the base station to sequentially activate the narrowbeams to transmit the RAR message and determining the location of the vehicle based upon the reception of the RRC connection request, in other embodiments, the base station is additionally or alternatively similarly configured to sequentially activate the narrowbeams to transmit the sync message and determine the location of the vehicle based upon the reception of the RACH preamble message.

FIG. 820 illustrates a block diagram of an example vehicle controller 820 (such as the vehicle controller 120 of FIG. 1) that may be configured to implement the various functionality described with respect to disclosed vehicles. The vehicle controller 820 may include, for example, one more central processing units (CPUs) or processors 852, and one or more busses or hubs 853 that connect the processor(s) 852 to other elements of the vehicle controller 820, such as a volatile memory 854, a non-volatile memory 855, a display controller 856, and an I/O controller 857. The volatile memory 854 and the non-volatile memory 855 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 854 and/or the memory 855 may store instructions 858 that are executable by the processor 852. For example, the instructions may configure the vehicle controller 820 to perform the network synchronization techniques of described herein. In some embodiments, at least one of the memories 854 and 855 may additionally store base station data associated with the base stations that form the communication network (e.g., base station identifiers, base station locations, sector orientations, and/or correspondence between subsectors and RA sequences). In some embodiments, at least some of the base station data is stored at a data storage device external to and operative connected with the vehicle controller 820 (such as the base station database 122 of FIG. 1).

The vehicle controller 820 may also include network interfaces 877 controlled by the I/O control 857. The network interfaces 877 may be any number of antenna, transmitters, receivers, transceivers, etc. specifically configured to transmit or receive data at a particular frequency and/or frequency range. To this end, the instructions may include instructions that, when executed by the processors 852, cause the network interfaces 877 to transmit data over a local communication link and/or an external communication link. Similarly, when the network interfaces 877 receives data, the instructions may include instructions that cause the processors 852 to analyze and/or process the received data.

Figure 8:
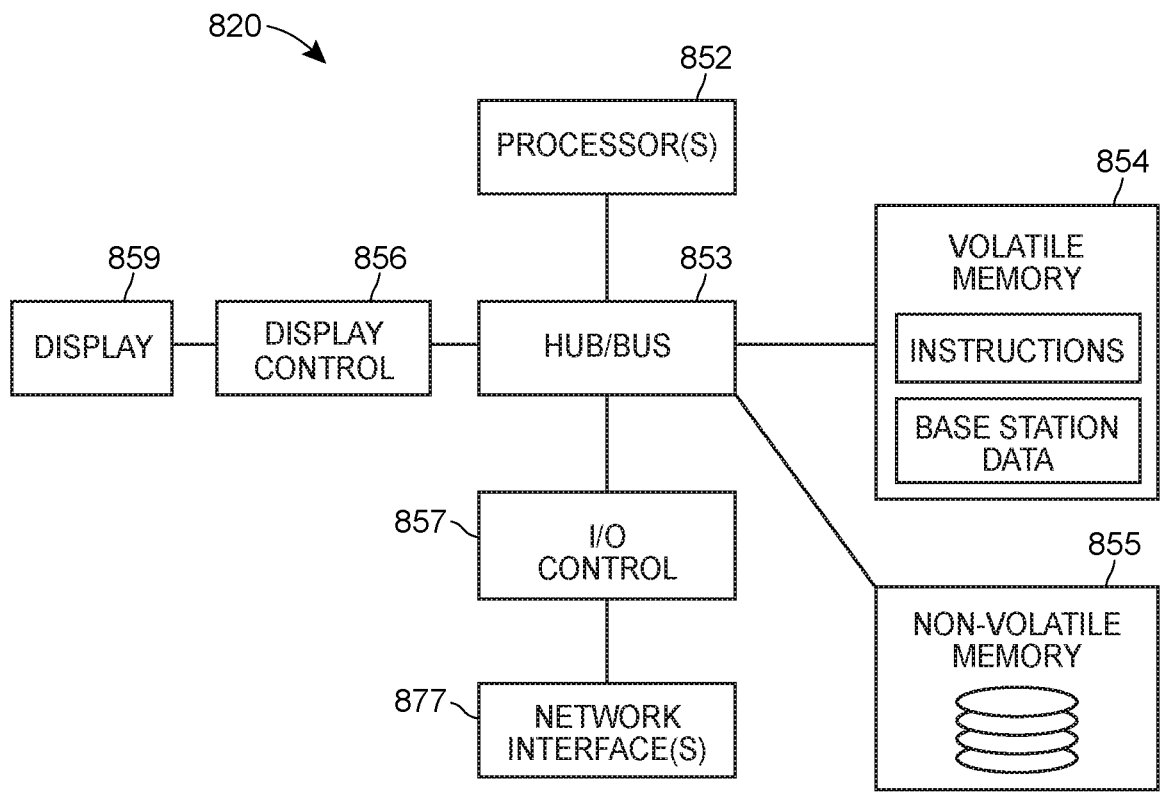
FIG. 8 is a block diagram of a vehicle controller that facilitates the synchronization techniques disclosed herein, such as the vehicle controller depicted in FIG. 1.

The illustrated vehicle controller 820 is only one example of a vehicle controller suitable to be particularly configured for use in the vehicle 105. Other embodiments of the vehicle controller 820 may also be particularly configured for use in the vehicle 105, even if the other embodiments have additional, fewer, or alternative components than shown in FIG. 8, have one or more combined components, or have a different configuration or arrangement of the components. Moreover, the various components shown in FIG. 8 can be implemented in hardware, a processor executing software instructions, or a combination of both hardware and a processor executing software instructions, including one or more signal processing and/or application specific integrated circuits.

Figure 9:
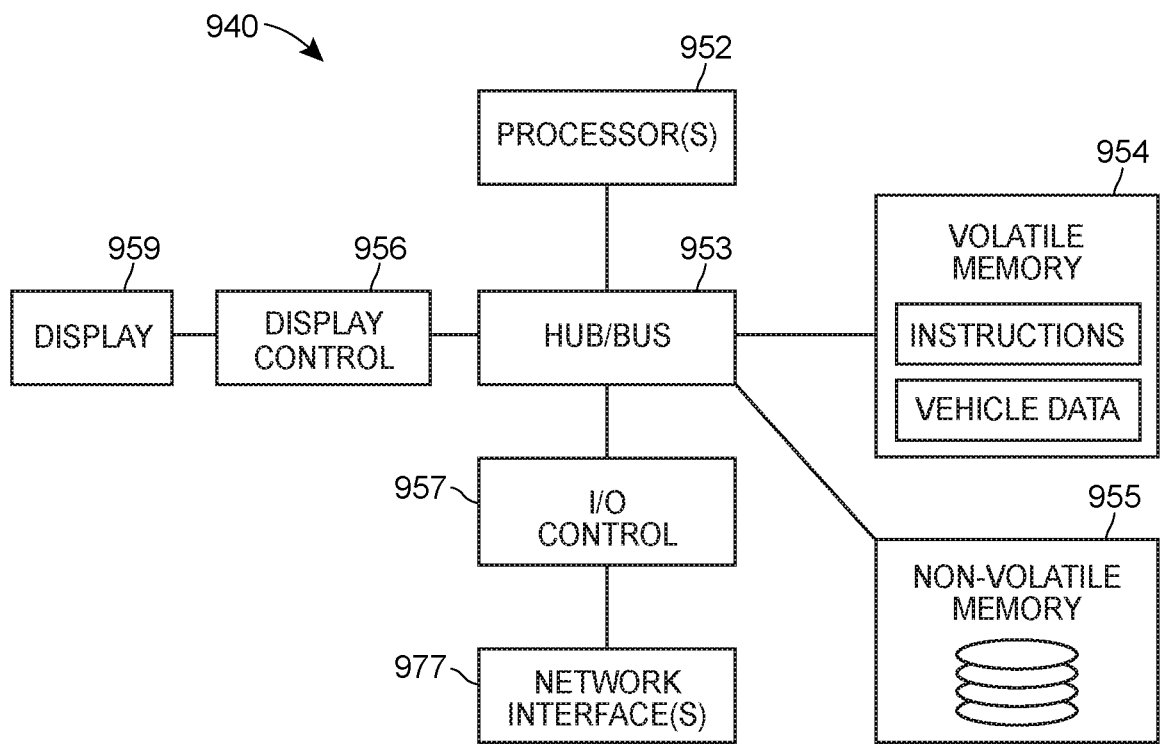
FIG. 9 is a block diagram of a base station controller that facilitates the synchronization disclosed herein, such as the base station controller depicted in FIG. 1.

FIG. 9 illustrates a block diagram of an base station controller 940 (such as the base station controller 140 of FIG. 1) that configures a base station (such as the base station 145 of FIG. 1) to perform the functionality described herein. The base station controller 940 may include, for example, one more central processing units (CPUs) or processors 952, and one or more busses or hubs 953 that connect the processor(s) 952 to other elements of the base station controller 940, such as a volatile memory 954, a non-volatile memory 955, a display controller 956, and an I/O controller 957. The volatile memory 954 and the non-volatile memory 955 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 954 and/or the memory 955 may store instructions 958 that are executable by the processor 952. For example, in a base station controller particularly configured to perform the synchronization techniques described herein with respect to FIGS. 6 and 7. In some embodiments, at least one of the memories 954 and 955 may additionally store a data that associates vehicle with a location determined via the disclosed synchronization techniques. Additionally, the at least one of the memories 954 and 955 may store gain profiles associated with a plurality of subsectors and/or a set of RA sequences associated with each of the subsectors (not depicted).

Additionally, the base station controller 940 may include network interfaces 977 controlled by the I/O control 957. The network interfaces 977 may be any number of antenna, transmitters, receivers, transceivers, etc. specifically configured to transmit or receive data at a particular frequency and/or frequency range. In some embodiments, the network interfaces 977 includes a phased antenna array that is configured by the I/O control 957 in accordance with one or more gain profiles stored in the memories 954 and/or 955.

The illustrated base station controller 940 is only one example of base station controller suitable to be particularly configured for use in the base station 145. Other embodiments of the base station controller 940 may also be particularly configured for use in the base station 145, even if the other embodiments have additional, fewer, or alternative components than shown in FIG. 9, have one or more combined components, or have a different configuration or arrangement of the components. Moreover, the various components shown in FIG. 9 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method for a vehicle to establish a connection with a base station, the method comprising determining, by the one or more processors, a number of subsectors by which a spatial sector served by the base station is divided; corresponding, by the one or more processors, the subsectors to respective non-overlapping sets of random access sequences; receiving, from the base station, a sync message that includes an identifier of the base station; determining, by the one or more processors, a particular subsector in which the vehicle is located based upon a relative location between the vehicle and the base station; based on the determined subsector, identifying, by one or more processors, a particular set of random access sequences; and transmitting, to the base station, a random access channel (RACH) preamble message, wherein the RACH preamble message includes a particular random access sequence from within the particular set of random access sequences corresponding to the particular subsector.

2. The method of the previous aspect, wherein identifying the current subsector in which the vehicle is located comprises querying, by the one or more processors, a base station database using the received identifier to determine a physical location of the base station.

3. The method of any combination of the preceding aspects, wherein identifying the current subsector in which the vehicle is located comprises obtaining, by the one or more processors and from a locationing sensor on-board the vehicle, a location of the vehicle; and comparing, by the one or more processors, the physical location of the base station to the location of the vehicle.

4. The method of any combination of the preceding aspects, wherein the sync message is received via a widebeam transmission.

5. The method of any combination of the preceding aspects, further comprising in response to transmitting the RACH preamble message, receiving, from the base station and via a narrowbeam transmission directed at the subsector corresponding to the sequence included in the RACH preamble message, a RACH response (RAR) message.

6. The method of claim any combination of the preceding aspects, further comprising transmitting, to the base station, a packet data network (PDN) connection request message; and transmitting, via the requested PDN connection, a current location of the vehicle.

7. The method of any combination of the preceding aspects, wherein the current location of the vehicle corresponds to a different subsector than the particular subsector, and the method further comprises after transmitting the RRC complete message, receiving, from the base station, a forward link communication transmitted via a narrowbeam directed at a subsector that includes the current location of the vehicle.

8. A method for a base station to establish a connection with a vehicle, the method comprising corresponding, by one or more processors, subsectors of the base station to respective non-overlapping sets of random access sequences; broadcasting a sync message that includes an identifier of the base station; receiving, from the vehicle, a random access channel (RACH) preamble message that includes a random access sequence; identifying, by the one or more processors, a particular subsector of the base station corresponding to the random access sequence included in the RACH preamble message; activating, by the one or more processors, a narrowbeam directed at the particular subsector; and transmitting, to the vehicle via the narrowbeam, a RACH response (RAR) message.

9. The method of the previous aspect wherein broadcasting the sync message comprises activating, by the one or more processors, a widebeam that covers a sector of the base station; and transmitting, via the widebeam, the sync message.

10. The method of any combination of aspects 8-9, wherein broadcasting the sync message comprises determining, by the one or more processors, a transmit power for the sync message transmission; and transmitting, via a single carrier, the sync message using the transmit power.

11. The method of any combination of aspects 8-10, wherein transmitting the sync message comprises determining, by the one or more processors, a transmit power for the sync message transmission; dividing, by the one or more processors, the transmit power between two or more carriers; and transmitting, via the two or more carriers, the sync message using the respective power associated with each of the two or more carriers.

12. The method of any combination of aspects 8-11, wherein broadcasting the sync message comprises sequentially activating, by the one or more processors, narrowbeams that respectively correspond to the subsectors of the base station; and in response to activating a particular narrowbeam, transmitting, via the particular narrowbeam, the sync message.

13. The method of any combination of aspects 8-12, further comprising receiving, from the vehicle via a packet data network (PDN) connection, a location of the vehicle.

14. The method of any combination of aspects 8-13, further comprising identifying, by the one or more processors, a subsector of the base station corresponding to the location of the vehicle; activating, by the one or more processors, a narrowbeam directed at the subsector corresponding to the location of the vehicle; and transmitting, to the vehicle via the narrowbeam directed at the subsector corresponding to the location of the vehicle, forward link communications.

15. A method for a base station to establish a connection with a vehicle, the method comprising dividing, by one or more processors, a sector of the base station into a plurality of subsectors; configuring, by the one or more processors, an antenna array to associate the plurality of subsectors with a respective narrowbeam; broadcasting, by the one or more processors, a sync message that includes an identifier of the base station; receiving, from the vehicle, a random access channel (RACH) preamble message that includes a random access (RA) sequence; sequentially activating, by the one or more processors, the narrowbeams associated with the plurality of subsectors; when a particular narrowbeam associated with a particular subsector is activated, determining that the RA sequence included in the RACH preamble message corresponds to the particular subsector, and in response to the determination, broadcasting, over the particular narrowbeam, a RACH response (RAR) message; receiving, from the vehicle, a radio resource control (RRC) connection request; and associating, by the one or more processors, the vehicle with the subsector corresponding to the narrowbeam that was active when the RAR message was transmitted.

16. The method of the preceding aspect, wherein transmitting the RAR message comprises determining, by the one or more processors, a transmit power for the RAR message transmission; and transmitting, via a single carrier, the RAR message using the transmit power.

17. The method of any combination of aspects 15-16, wherein transmitting the RAR message comprises determining, by the one or more processors, a transmit power for the RAR message transmission; dividing, by the one or more processors, the transmit power between two or more carriers; and transmitting, via the two or more carriers, the RAR message using the respective power associated with each of the two or more carriers.

18. The method of any combination of aspects 15-17, wherein broadcasting the sync message comprises activating, by the one or more processors, a widebeam that covers the sector of the base station; and transmitting, via the widebeam, the sync message.

19. The method of any combination of aspects 15-18, further comprising receiving, from the vehicle via a packet data network (PDN) connection, a location of the vehicle; determining, by the one or more processors, a subsector that serves the location of the vehicle; and transmitting, via a narrowbeam corresponding to the subsector that serves the location of the vehicle, forward link communications.

What is claimed:

1. A method for a vehicle to establish a connection with a base station, the method comprising:
   determining, by the one or more processors, a number of subsectors by which a spatial sector served by the base station is divided;
   corresponding, by the one or more processors, the subsectors to respective non-overlapping sets of random access sequences;
   receiving, from the base station, a sync message that includes an identifier of the base station;
   determining, by the one or more processors, a particular subsector in which the vehicle is located based upon a relative location between the vehicle and the base station;
   based on the determined subsector, identifying, by one or more processors, a particular set of random access sequences; and
   transmitting, to the base station, a random access channel (RACH) preamble message, wherein the RACH preamble message includes a particular random access sequence from within the particular set of random access sequences corresponding to the particular subsector.

2. The method of claim 1, wherein identifying the current subsector in which the vehicle is located comprises:
   querying, by the one or more processors, a base station database using the received identifier to determine a physical location of the base station.

3. The method of claim 2, wherein identifying the current subsector in which the vehicle is located comprises:
   obtaining, by the one or more processors and from a locationing sensor on-board the vehicle, a location of the vehicle; and
   comparing, by the one or more processors, the physical location of the base station to the location of the vehicle.

4. The method of claim 1, wherein the sync message is received via a widebeam transmission.

5. The method of claim 1, further comprising:
   in response to transmitting the RACH preamble message, receiving, from the base station and via a narrowbeam transmission directed at the subsector corresponding to the sequence included in the RACH preamble message, a RACH response (RAR) message.

6. The method of claim 1, further comprising:
   transmitting, to the base station, a packet data network (PDN) connection request message; and
   transmitting, via the requested PDN connection, a current location of the vehicle.

7. The method of claim 6, wherein the current location of the vehicle corresponds to a different subsector than the particular subsector, and the method further comprises:
   after transmitting the RRC complete message, receiving, from the base station, a forward link communication transmitted via a narrowbeam directed at a subsector that includes the current location of the vehicle.

8. A method for a base station to establish a connection with a vehicle, the method comprising:
   corresponding, by one or more processors, subsectors of the base station to respective non-overlapping sets of random access sequences;
   broadcasting a sync message that includes an identifier of the base station;
   receiving, from the vehicle, a random access channel (RACH) preamble message that includes a random access sequence;
   identifying, by the one or more processors, a particular subsector of the base station corresponding to the random access sequence included in the RACH preamble message;
   activating, by the one or more processors, a narrowbeam directed at the particular subsector; and
   transmitting, to the vehicle via the narrowbeam, a RACH response (RAR) message.

9. The method of claim 8, wherein broadcasting the sync message comprises:
   activating, by the one or more processors, a widebeam that covers a sector of the base station; and
   transmitting, via the widebeam, the sync message.

10. The method of claim 8, wherein broadcasting the sync message comprises:
   determining, by the one or more processors, a transmit power for the sync message transmission; and
   transmitting, via a single carrier, the sync message using the transmit power.

11. The method of claim 8, wherein transmitting the sync message comprises:
   determining, by the one or more processors, a transmit power for the sync message transmission;
   dividing, by the one or more processors, the transmit power between two or more carriers; and
   transmitting, via the two or more carriers, the sync message using the respective power associated with each of the two or more carriers.

12. The method of claim 8, wherein broadcasting the sync message comprises:
   sequentially activating, by the one or more processors, narrowbeams that respectively correspond to the subsectors of the base station; and
   in response to activating a particular narrowbeam, transmitting, via the particular narrowbeam, the sync message.

13. The method of claim 8, further comprising:
   receiving, from the vehicle via a packet data network (PDN) connection, a location of the vehicle.

14. The method of claim 13, further comprising:
   identifying, by the one or more processors, a subsector of the base station corresponding to the location of the vehicle;
   activating, by the one or more processors, a narrowbeam directed at the subsector corresponding to the location of the vehicle; and
   transmitting, to the vehicle via the narrowbeam directed at the subsector corresponding to the location of the vehicle, forward link communications.

15. A method for a base station to establish a connection with a vehicle, the method comprising:
   dividing, by one or more processors, a sector of the base station into a plurality of subsectors;
   configuring, by the one or more processors, an antenna array to associate the plurality of subsectors with a respective narrowbeam;
   broadcasting, by the one or more processors, a sync message that includes an identifier of the base station;
   receiving, from the vehicle, a random access channel (RACH) preamble message that includes a random access (RA) sequence;
   sequentially activating, by the one or more processors, the narrowbeams associated with the plurality of subsectors;
   when a particular narrowbeam associated with a particular subsector is activated:
      determining that the RA sequence included in the RACH preamble message corresponds to the particular subsector, and
      in response to the determination, broadcasting, over the particular narrowbeam, a RACH response (RAR) message;
   receiving, from the vehicle, a radio resource control (RRC) connection request; and
   associating, by the one or more processors, the vehicle with the subsector corresponding to the narrowbeam that was active when the RAR message was transmitted.

16. The method of claim 15, wherein transmitting the RAR message comprises:
   determining, by the one or more processors, a transmit power for the RAR message transmission; and
   transmitting, via a single carrier, the RAR message using the transmit power.

17. The method of claim 15, wherein transmitting the RAR message comprises:
   determining, by the one or more processors, a transmit power for the RAR message transmission;
   dividing, by the one or more processors, the transmit power between two or more carriers; and
   transmitting, via the two or more carriers, the RAR message using the respective power associated with each of the two or more carriers.

18. The method of claim 15, wherein broadcasting the sync message comprises:
   activating, by the one or more processors, a widebeam that covers the sector of the base station; and
   transmitting, via the widebeam, the sync message.

19. The method of claim 15, further comprising:
   receiving, from the vehicle via a packet data network (PDN) connection, a location of the vehicle;
   determining, by the one or more processors, a subsector that serves the location of the vehicle; and
   transmitting, via a narrowbeam corresponding to the subsector that serves the location of the vehicle, forward link communications.

* * * * *